Feb. 7, 1967  N. FORREST  3,303,246
METHOD OF MAKING LEVEL TABLE AND RUBBER MOLD
Filed Sept. 21, 1964
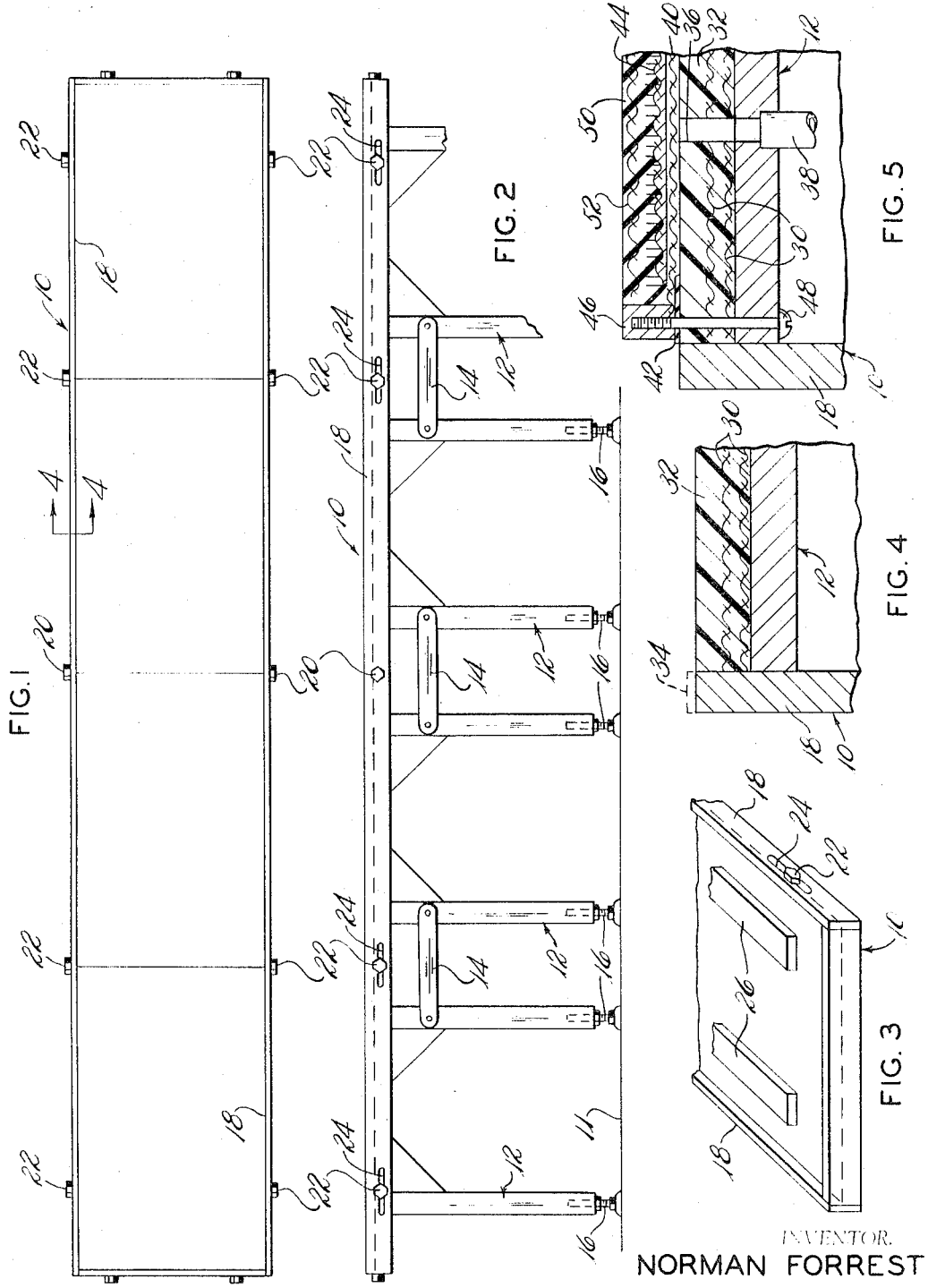
INVENTOR.
NORMAN FORREST
BY Oldham + Oldham
ATTYS.

United States Patent Office 3,303,246
Patented Feb. 7, 1967

3,303,246
METHOD OF MAKING LEVEL TABLE AND
RUBBER MOLD
Norman Forrest, 216 Byram Road,
Byram, Conn. 10573
Filed Sept. 21, 1964, Ser. No. 397,848
8 Claims. (Cl. 264—90)

This invention relates to methods for making large, level, uniform-expansion tables, and to making highly uniform rubber molds to be used in reproducing textile fabrics, and the like.

In the reproduction of textile fabrics utilizing vinyl plastisols and the like for the reproductions, it has been found that silicone rubber molds can be produced by casting the rubber against the appropriately treated textile fabric. See applicant's copending application Serial No. 195,869, filed May 18, 1962, and entitled, "Method of Making a Mold for Copying Fabric, Lace, Matting, and Similar Materials." However, difficulty has been experienced in producing a rubber mold of sufficiently uniform thickness. When the rubber mold is not of uniform thickness then any vinyl plastisols cast into it may be of a non-uniform thickness. This means that the vinyl reproductions of the textile fabric may vary in thickness with accompanying changes in color or appearance so that the resulting product may be objectionable commercially.

It has been found that if the rubber mold is produced on an absolutely level table that the uniformity of thickness of the mold and of the vinyl plastisol product produced in the mold is notably enhanced. However, difficulty has been experienced in obtaining any truly level table from known commercial sources, and this is particularly true because the rubber mold to be produced on the table is desirably in a length of 40 feet, or more, and a width of from 30 inches to 72 inches. A mold of the indicated type adapts itself to the formation of an endless molding belt for use in continuous processes for the manufacture of the simulated textile fabric with vinyl plastisols.

Moreover, it has been found that any level table used in molding a rubber mold of the size indicated is apt to be distorted into and out of level condition even though initially made level, all due to temperature changes occurring in normal manufacturing operations. This has been due, it is believed, to non-uniform masses in the table longitudinally or laterally thereof.

It is the general object of the present invention to avoid and overcome the foregoing and other difficulties of and objections to prior art practices by the provision of an improved method for making a large level table which will maintain its level even when subjected to temperature variations.

Another object of the invention is to provide an improved method for making a cast silicone rubber mold many feet in length and of considerable width while insuring a uniform thickness throughout the mold.

Another object of the invention is to provide an improved method for making a level table wherein the table has substantially uniform expansion characteristics both longitudinally and laterally so as to avoid distortions of the table when it is subjected to temperature changes.

The foregoing objects of the invention, and other objects which will become apparent as the description proceeds, are achieved by that method of making a large, level, uniform-expansion table which includes the steps of joining a series of flat-topped tables flexibly together, applying a rail around the tables, rendering the top of the tables and the inside of the rail liquid-tight, placing vertical spacing means on each table, pouring liquid on the table tops to substantially the vertical height of the spacing means, adjusting the vertical height of each corner of each table to bring the top of each spacing means to the level of the liquid, removing the liquid, and the spacing means, casting a setable plastic on the table tops inside the rail, and setting the plastic.

In terms of the method of making a uniform thickness rubber mold the invention is achieved by that method of making a table which includes the steps of joining a series of flat top tables together end to end, applying a rail around the assembled tables, covering the tables and rail with a water-tight sheet of plastic, placing a similar vertical spacing means on each table having a vertical height slightly less than the height of the rail above the tables, pouring liquid on the table tops to substantially the vertical height of each spacing means, adjusting the vertical height of each corner of each table to bring the top of each spacing means to the level of the liquid, removing the spacing means, liquid, and plastic sheet, placing fabric on the top of the assembled tables inside the rail, pouring a free-flowing, setable plastic over the fabric to a depth slightly under the vertical height of the rail, allowing the plastic to seek its level, effecting the setting of the plastic, boring holes through the plastic at selected areas, connecting the holes to vacuum producing conduits under the tables, applying an air-pervious cloth over the tables inside the rail, applying a fence to the top of the table inside the rail, placing a sheet of textile inside the fence, applying a vacuum to the conduits to hold the textile flat, applying silicone rubber to a selected depth to the textile inside the fence, reinforcing the rubber, curing the rubber, stripping the rubber from the textile to provide a mold, releasing the vacuum and removing the textile.

For a better understanding of the invention reference should be had to the accompanying drawings wherein:

FIGURE 1 is a plan view of a table constructed in accordance with the method of the invention;

FIGURE 2 is a side elevation of the table of FIGURE 1;

FIGURE 3 is a perspective view, largely broken away, illustrating the leveling step of the method of the invention;

FIGURE 4 is an enlarged fragmentary view illustrating the step of casting the setable plastic on the table; and FIGURE 5 is a view similar to FIGURE 4 and showing the completion of the table and the casting of the rubber mold thereon.

In the drawings, the numeral 10 indicates generally a large level uniform-expansion table. The table 10, by way of example, can be 40 feet or more in length, and have a width of from 30 inches to 74 inches. The table 10 is positioned on a floor 11 preferably concrete and selected for its solidity.

The table 10 is made up from a plurality of smaller tables 12 each having a flat top and a plurality of legs, usually four, with the tables 12 being flexibly connected together as by links 14 pivotally fastened at their ends to the legs of adjacent tables and holding the tables in abutting end to end relation but allowing vertical adjustment and leveling of each table. For this purpose, a vertically adjustable screw 16 is associated with each table leg.

Around the edge of the assembled table is provided a rail 18 which is upstanding from the top of the table a selected distance, for example ½ inch. The center of each rail is fixed by suitable means such as a cap screw 20 to the center of the table 10, with the ends of each rail being secured by cap screws 22 to the table, but with the cap screws 22 extending through slots 24 which allow for linear expansion and contraction of the rails 18 independently of the table 10.

After the table has been assembled in the manner described its upper surface and the inside of the rail 18 is rendered water or liquid tight. This is conveniently accomplished simply by placing over the top of the table and the rail a relatively thin flexible sheet of plastic, for example, a vinyl film which will cover the entire top of the table 10 and extend up over the rail 18. There is now placed on each table 12 vertical spacing means of uniform vertical height. One or more of these spacing means can be utilized on each table. FIGURE 3 shows two such spacing means in the form of flat metal bars 26 which are laid down on top of the table and which serve to hold the plastic film (not shown in FIGURE 3) flat on top of the table. Water or other suitable liquid is now poured on top of the table up to substantially the height of the spacing means 26. The vertical height of the spacing means 26 is usually something less than the vertical height of the rails 18 above the surface of the top of the tables so that the liquid is held within the rail 18 of the table 10.

Now each individual table 12 and the screw means 16 on each leg of each table is vertically adjusted so as to bring the top edge of each spacing means 26 to the top of the water on all of the tables 12. This brings all of the tables into a flat plane which is level, and with the thickness of the layer of water on the table 10 being uniform over the full length and width of the table. Once the table is adjusted in the manner described it is not moved from its position on the floor.

The spacing means 26, the liquid on the table 10 and the plastic film, if one is used, are now removed from the table 10 and fabric is laid on the table 10 inside of the rail 18 over the entire surface of the table. Such fabric is indicated by the numeral 30 in FIGURE 4 and is conveniently a glass fiber fabric of high strength and durability. There is now poured onto the top of the table 10 a free flowing liquid plastic of a setable character, for example, a liquid epoxy resin which is allowed to seek its level inside of the rails 18. The resin is then caused to set up, either by a self contained catalytic agent, or by means of heat, or both, to produce substantially the structure shown in FIGURE 4 of the drawings. The epoxy or other plastic in FIGURE 4 is indicated by the numeral 32. It will be seen that the level at the top of the plastic 32 is somewhat under the dotted line 34 which in FIGURE 4 is employed to indicate the top level of the rail 18 at the time the plastic 32 is poured therein. After the plastic 32 has been fully set then the portion of each side rail indicated by the numeral 34 and extending above the surface of the plastic 32 is usually ground down to the level of the top of the plastic 32 to provide the structure shown in solid lines in FIGURE 4.

A plurality of vertical holes 36 are drilled through the plastic 32 and the table 12 and conduits 38 extending under the table 12 are connected to the holes 36, and the conduits 38 are connected to a vacuum system so that the holes 36 can be evacuated over the surface of the plastic 32. It has been found that a relatively small number of holes 36, for example, only one or several, can be provided in each table 12 if the upper surface of the plastic 32 is covered with an air pervious fabric. FIGURE 5 provides an air pervious fabric 40, for example of nylon, which extends over the entire surface of the plastic 32 with the edge of the fabric 40 being cemented at 42 to the plastic 32 just inside of the rail 18.

The table is now complete insofar as being able to hold or receive materials thereon in flat and level position over considerable widths of material and many feet of length.

In a typical use of the completed table a textile fabric 44, such as to be simulated in vinyl plastisol is first appropriately treated, as with a wax, to render it air impervious, and to adapt it to be used to make a silicone rubber mold. See the above referred to pending patent application. The textile fabric 44 is of or is cut to a size so that it will lay down on the air pervious cover 40 inside of the rails 18 so that when vacuum is applied to the holes 36 the vacuum will flow out laterally from each hole 36 through the air pervious fabric 40 to hold the entire air impervious textile fabric 44 in a very flat, smooth position on the table. A silicone rubber in liquid form is now applied over the top of the textile fabric 44, and this is conveniently done by building a carriage (not shown) which rides on rails 18 and which carries a wide hopper filled with the silicone rubber, with the forward movement of the carriage along the table 10 laying down a wide ribbon of silicone rubber from which air has been extracted, over the surface of the textile fabric 44. A typical forward speed of movement of the carriage is six inches a minute. This movement is relatively slow because the silicone rubber is usually quite viscous. In fact, the silicone rubber may be of sufficient viscosity that it need not be supported at the edges of the textile fabric 44.

However, in the usual practice of the invention a fence 46 is provided on the table 10 to fully surround the textile fabric 44. The fence 46 can be held in position on the table by means of screws 48 extending up through the table into the fence. The height of the fence 46 is typically of a height equal to the thickness of the rubber mold to be formed, as seen in FIGURE 5. In this figure of the drawing the numeral 50 indicates the silicone rubber applied against the upper surface of the textile fabric 44 within the boundaries of the fence 46. The silicone rubber may be reinforced with netting or fabric 52. The silicone rubber 50 is now allowed to set up, either by means of a setting catalyst or by means of heat, or both. During this operation the silicone rubber seeps and achieves the same flat level as the plastic 32 did, as above described. The result is the production of a rubber mold of very uniform thickness and of considerable width and length bearing the imprint of the textile fabric 44 on the lower surface of the mold. After the silicone rubber has been completely set up the silicone rubber mold is stripped progressively from the textile fabric 44 as by progressively rolling up the rubber mold from one end of the table to the other. The rubber mold can be turned over, joined into an endless belt and can thereafter be used in a continuous process for molding vinyl plastisols into a simulation of the textile fabric 44, for example, by wiping the vinyl plastisol onto and into the surface of the silicone rubber mold by means of doctor bars, followed by curing of the vinyl plastisol and the stripping thereof from the silicone rubber mold, all in a continuous production operation. See the aforesaid pending patent application.

It is evident that once the rubber mold has been stripped from the textile fabric 44 the vacuum can be cut off from the holes 36 whereupon the textile fabric 44 can be removed from the table leaving the table ready to perform another mold making operation on a selected textile fabric.

While a certain representative embodiment and details have been shown for the purpose of illustrating the invention, it will be apparent to those skilled in this art that various changes and modifications may be made therein without departing from the spirit or scope of the invention.

What is claimed is:

1. That method of making a flexible rubber-like mold which includes the steps of joining a series of flat-top tables together end to end, applying a rail around the assembled tables, covering the tables and rail with a watertight sheet of plastic, placing a similar flat metal bar on each table having a vertical height slightly less than the height of the rail above the tables, pouring liquid on the table tops to substantially the vertical height of each bar, adjusting the vertical height of each corner of each table to bring the top of each bar to the level of the liquid, removing the bars, liquid, and plastic sheet, placing fiber glass fabric on the top of the assembled tables inside the rail, pouring a free-flowing, time-setting plastic over the fabric to a depth slightly under the vertical height of the rail, allowing the plastic to seek its level, effecting the setting of the plastic, grinding down the rail to the height of the plastic, boring vertical holes through the plastic at selected areas, connecting the holes to vacuum producing conduits under the tables, applying an air-pervious cloth over the tables and securing it at its edges to the plastic inside the rail, applying a fence to the top of the table inside the rail, positioning a sheet of textile inside the fence, applying a vacuum to the conduits to hold the textile flat, applying silicone rubber to a selected depth inside the fence to the textile, reenforcing the rubber with fabric, curing the rubber with heat, and stripping the rubber from the textile to provide a mold.

2. That method of making a flexible rubber-like mold which includes the steps of joining a series of flat-top tables together end to end, applying a rail around the assembled tables, covering the tables and rail with a watertight sheet of plastic, placing a similar flat metal bar on each table having a vertical height slightly less than the height of the rail above the tables, pouring liquid on the table tops to substantially the vertical height of each bar, adjusting the vertical height of each corner of each table to bring the top of each bar to the level of the liquid, removing the bars, liquid, and plastic sheet, placing fabric on the top of the assembled tables inside the rail, pouring a free-flowing setable plastic over the fabric to a depth slightly under the vertical height of the rail, allowing the plastic to seek its level, effecting the setting of the plastic, boring holes through the plastic at selected areas, connecting the holes to vacuum producing conduits under the tables, applying an air-pervious cloth over the tables inside the rail, applying a fence to the top of the table inside the rail, positioning a sheet of textile inside the fence, applying a vacuum to the conduits to hold the textile flat, applying silicone rubber to a selected depth inside the fence to the textile, reenforcing the rubber with fabric, curing the rubber with heat, and stripping the rubber from the textile to provide a mold.

3. That method of making a flexible rubber-like mold which includes the steps of joining a series of flat-top tables together end to end, applying a rail around the assembled tables, covering the tables and rail with a watertight sheet of plastic, placing a similar flat metal bar on each table having a vertical height slightly less than the height of the rail above the tables, pouring liquid on the table tops to substantially the vertical height of each bar, adjusting the vertical height of each corner of each table to bring the top of each bar to the level of the liquid, removing the bars, liquid, and plastic sheet, placing fabric on the top of the assembled tables inside the rail, pouring a free-flowing setable plastic over the fabric to a depth slightly under the vertical height of the rail, allowing the plastic to seek its level, effecting the setting of the plastic, boring holes through the plastic at selected areas, connecting the holes to vacuum producing conduits under the tables, applying an air-pervious cloth over the tables inside the rail, positioning a sheet of textile inside the rail, applying a vacuum to the conduits to hold the textile flat, applying silicone rubber to a selected depth inside the rail to the textile, reenforcing the rubber with fabric, curing the rubber with heat, and stripping the rubber from the textile to provide a mold.

4. That method of making a table which includes the steps of joining a series of flat-top tables together end to end, applying a rail around the assembled tables, covering the tables and rail with a water-tight sheet of plastic, placing a similar flat metal bar on each table having a vertical height slightly less than the height of the rail above the tables, pouring liquid on the table tops to substantially the vertical height of each bar, adjusting the vertical height of each corner of each table to bring the top of each bar to the level of the liquid, removing the bars, liquid, and plastic sheet, placing fiber glass fabric on the top of the assembled tables inside the rail, pouring a free-flowing, time-setting plastic over the fabric to a depth slightly under the vertical height of the rail, allowing the plastic to seek its level, effecting the setting of the plastic, grinding down the rail to the height of the plastic, boring vertical holes through the plastic at selected areas, connecting the holes to vacuum producing conduits under the tables, and applying an air-pervious cloth over the tables and securing it at its edges to the plastic inside the rail.

5. That method of making a table which includes the steps of joining a series of flat-top tables together end to end, applying a rail around the assembled tables, covering the tables and rail with a water-tight sheet of plastic, placing a similar flat metal bar on each table having a vertical height slightly less than the height of the rail above the tables, pouring liquid on the table tops to substantially the vertical height of each bar, adjusting the vertical height of each corner of each table to bring the top of each bar to the level of the liquid, removing the bars, liquid, and plastic sheet, placing fabric on the top of the assembled tables inside the rail, pouring a free-flowing setable plastic over the fabric to a depth slightly under the vertical height of the rail, allowing the plastic to seek its level, effecting the setting of the plastic, boring holes through the plastic at selected areas, connecting the holes to vacuum producing conduits under the tables, and applying an air-pervious cloth over the tables and inside the rail.

6. That method of making a large, level flat-topped, uniform expansion table which includes the steps of joining a series of flat-topped tables flexibly together, applying a rail around the tables in a manner to leave the rail free for expansion or contraction, covering the tables and rail with a water-tight sheet of plastic, placing vertical spacing means on each table, pouring liquid on the table tops to substantially the vertical height of the spacing means, adjusting the vertical height of each corner of each table to bring the top of each spacing means to the level of the liquid, removing the sheet of plastic, the liquid, and the spacing means, casting a setable plastic on the table tops inside the rail, setting the plastic, and grinding the rail down to the level of the plastic.

7. That method of making a large, level flat-topped, uniform expansion table which includes the steps of joining a series of flat-topped tables flexibly together, applying a rail around the tables, covering the tables and rail with a water-tight sheet of plastic, placing vertical spacing means on each table, pouring liquid on the table tops to substantially the vertical height of the spacing means, adjusting the vertical height of each corner of each table to bring the top of each spacing means to the level of the liquid, removing the sheet of plastic, the liquid, and the spacing means, casting a setable plastic on the table tops inside the rail, and setting the plastic.

8. That method of making a large, level flat-topped, uniform expansion table which includes the steps of joining a series of flat-topped tables flexibly together, applying a rail around the tables, rendering the top of the tables and the inside of the rail liquid-tight, placing vertical spacing means on each table, pouring liquid on the table tops to substantially the vertical height of the spacing means, adjusting the vertical height of each corner of each table to bring the top of each spacing means to the level of the liquid, removing the liquid, and the spacing means, casting a setable plastic on the table tops inside the rail, and setting the plastic.

(References on following page)

References Cited by the Examiner

UNITED STATES PATENTS

| | | | |
|---|---|---|---|
| 155,635 | 10/1874 | Brotherton | 248—188.4 |
| 2,066,596 | 1/1937 | West | 264—219 X |
| 2,172,466 | 9/1939 | Edwardes et al. | 264—225 |
| 2,715,280 | 8/1955 | Kish | 264—257 X |
| 2,915,427 | 12/1959 | Schriner et al. | |
| 3,039,164 | 6/1962 | Kemeny et al. | 25—122 X |
| 3,190,947 | 6/1965 | Norcross | 264—166 |

FOREIGN PATENTS 1,146,372  11/1957  France.

OTHER REFERENCES

Johnson Products Inc.; Swaptops; filed in Office January 12, 1959; 4 pages.

ROBERT F. WHITE, *Primary Examiner.*

T. J. CARVIS, *Assistant Examiner.*